United States Patent [19]

Gembicki et al.

[11] 4,036,784

[45] July 19, 1977

[54] METHOD OF PRODUCING AN EXTRUDED CATALYST COMPOSITION

[75] Inventors: Stanley A. Gembicki, Western Springs, Ill.; Stefan H. Aeschbach, Forch, Switzerland

[73] Assignee: UOP Inc., Des Plaines, Ill.

[21] Appl. No.: 722,319

[22] Filed: Sept. 10, 1976

Related U.S. Application Data

[63] Continuation-in-part of Ser. No. 582,522, May 30, 1975, abandoned.

[51] Int. Cl.² .................. B01J 23/16; B01J 23/24; B01J 21/00
[52] U.S. Cl. .................................. 252/465; 252/463; 252/461
[58] Field of Search .......... 252/461, 463, 465, 466 PT, 252/466 J, 470

[56] References Cited

U.S. PATENT DOCUMENTS

| | | | |
|---|---|---|---|
| 3,213,040 | 10/1965 | Pedigo et al. | 252/466 J X |
| 3,661,805 | 5/1972 | Horvath | 252/463 X |
| 3,872,030 | 3/1975 | Feins et al. | 252/466 J X |
| 3,873,470 | 3/1975 | Conway et al. | 252/466 J X |
| 3,894,966 | 7/1975 | Conway | 252/466 J X |

*Primary Examiner*—Winston A. Douglas
*Assistant Examiner*—William G. Wright
*Attorney, Agent, or Firm*—James R. Hoatson, Jr.; Robert W. Welch; William H. Page II

[57] ABSTRACT

This invention relates to an extruded composition characterized by its method of preparation. A finely divided refractory inorganic oxide, preferably an alpha-alumina monohydrate, is admixed with a peptizing agent and sufficient water to produce a mixture which has a weight loss on ignition at 900° C. of from about 50 to about 70%. The mixture is subjected to shear-mixing, the intensity or severity of the shear-mixing being characterized by an energy input equivalent to from about 15 to about 120 watt-hours per pound of dry refractory inorganic oxide contained in said mixture over a period of from about 0.5 to about 5 minutes. The resulting dough is subsequently extruded and the extrudate calcined. The product is particularly useful as a hydrotreating catalyst in combination with a Group VIB and Group VIII metal component.

17 Claims, No Drawings

METHOD OF PRODUCING AN EXTRUDED CATALYST COMPOSITION

CROSS-REFERENCE TO RELATED APPLICATIONS

This application is a continuation-in-part of a copending application Ser. No. 582,522 filed May 30, 1975 now abandoned.

It has become well known that oxides of sulfur, plus lesser amounts of other sulfurous compounds, are among the major pollutants of the atmosphere. It has been estimated that, in this country alone, in excess of 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur, and legislation has been effected or proposed which is particularly directed to the limitation of sulfurous compounds in residual fuel oils to be burned in densely populated areas. The supply of residual fuel oils of suitably low sulfur content is entirely inadequate for present-day requirements and it becomes increasingly important to develop improved desulfurization techniques to treat the more accessible and abundant fuel oils of relatively high sulfur content.

Desulfurization technology is presently concerned with hydrotreating, or hydrodesulfurization, methods and to the development of hydrodesulfurization catalysts that are more selective and/or function under less severe reaction conditions to obviate hydrocracking of the residual fuel oils being treated. Said reaction conditions typically include a temperature of from about 95° to about 425° C., although temperatures in the higher range, say from about 315° to about 425° C., are generally preferred. Hydrodesulfurization reaction conditions further include an imposed hydrogen pressure of from about 100 to about 2000 psi, the hydrogen being normally charged to the process in admixture with recycled hydrogen to provide from about 1000 to about 50,000 standard cubic feet per barrel of hydrocarbon charge stock. The sulfur-containing feed stock is suitably processed over the catalyst in combination with the hydrogen charge at a liquid hourly space velocity of from about 0.5 to about 20.

It is an object of this invention to present an extruded composition having particular utility in combination with a Group VIB and Group VIII metal component to provide a catalyst of improved activity with respect to the hydrodesulfurization of residual fuel oils at the disclosed hydrodesulfurization reaction conditions.

In one of its broad aspects, the present invention embodies an extruded composition prepared by the method which comprises admixing a finely divided refractory inorganic oxide, a peptizing agent and sufficient water to produce a mixture characterized by a weight loss on ignition at 900° C. of from about 50 to about 70%; maintaining said mixture under shear-mixing conditions, the intensity of said shear-mixing being characterized by an energy input equivalent to from about 15 to about 120 watt-hours per pound of dry refractory inorganic oxide contained in said mixture for a period of from about 0.5 to about 5 minutes; extruding the resulting dough; and drying and calcining the extrudate.

A more specific embodiment of the present invention is in an extruded composition prepared by the method which comprises admixing a finely divided alpha-alumina monohydrate, a peptizing agent and sufficient water to produce the mixture characterized by a weight loss on ignition at 900° C. of from about 50 to about 70%; maintaining said mixture under shear-mixing conditions, the intensity of said shear-mixing being characterized by an energy input equivalent to from about 15 to about 60 watt-hours per pound of dry alumina contained in said mixture for a period of from about 1 to about 3 minutes; extruding the resulting dough; and calcining the extrudate at a temperature of from about 315° to about 650° C.

A still more specific embodiment of the present invention relates to an extruded composition prepared by the method which comprises admixing a peptizing agent with a finely divided alpha-alumina monohydrate and sufficient water to produce a mixture characterized by a weight loss on ignition at 900° C. of from about 55 to about 65%, said alumina being a blend of an alpha-alumina monohydrate having an average bulk density of from about 0.7 to about 0.9 grams per cubic centimeter with an alpha-alumina monohydrate having an average bulk density of about 0.2 to about 0.3 grams per cubic centimeter, the blend having an average bulk density of from about 0.4 to about 0.5 grams per cubic centimeter; maintaining said mixture under shear-mixing conditions, the intensity of said shear-mixing being characterized by an energy input equivalent to from about 15 to about 60 watt-hours per pound of dry alumina contained in said mixture for a period of from about 1 to about 3 minutes, extruding the resulting dough; and calcining the extrudate at a temperature of from about 315° to about 650° C.

Other objects and embodiments of this invention will become apparent in the following detailed specification.

In accordance with the present invention, a peptizing agent is initially admixed with a finely divided refractory inorganic oxide and sufficient water to produce a mixture characterized by a weight loss on ignition at 900° C. of from about 50 to about 70%. The expression "finely divided" is intended as descriptive of particles having an average diameter of less than about 150 microns, for example, particles recoverable through a 105 micron microsieve. The refractory inorganic oxide can be such as alumina, silica, zirconia, thoria, boria, chromia, magnesia, titania, and the like, or composites thereof, for example, alumina-silica, alumina-zirconia, alumina-chromia, etc. Alumina is a preferred refractory inorganic oxide, particularly alpha-alumina monohydrate of the boehmite structure. Finely divided alpha-alumina monohydrate is commercially available in various densities. However, an alpha-alumina monohydrate of one density is not necessarily equivalent to an alpha-alumina monohydrate of another density with respect to the hydrotreating process herein contemplated. An alpha-alumina monohydrate especially suitable for use herein is one having an average bulk density of from about 0.4 to about 0.5 grams per cubic centimeter. It is a preferred practice to employ an alpha-alumina monohydrate blend, specifically, a blend of an alpha-alumina monohydrate having an average bulk density of from about 0.7 to about 0.9 grams per cubic centimeter with an alpha-alumina monohydrate having an average bulk density of from about 0.2 to about 0.3 grams per cubic centimeter, taking advantage of the catalytic properties of the higher density alumina and the bonding properties of the lower density alumina to provide an extruded product of suitable durability as well as improved activity. In any case, the alpha-alumina monohydrates are preferably combined in a ratio to provide a blend with the aforementioned average bulk density of from about 0.4 to about 0.5 grams per cubic centimeter.

The finely divided refractory inorganic oxide is admixed with a peptizing agent and sufficient water to provide a mixture characterized by a weight loss on ignition at 900° C. of from about 50 to about 70%, and preferably from about 55 to about 65%. The peptizing agent is suitably a weak acid such as formic acid, acetic acid, propionic acid, and the like, although strong acids, for example, sulfuric acid, hydrochloric acid, and especially nitric acid, are preferable. Typically, the peptizing agent will be admixed with the finely divided refractory inorganic oxide as an aqueous solution thereof to provide at least a portion of the required water content of the mixture.

The shear-mixing conditions herein contemplated are substantially as practiced in the art to achieve a uniform dispersion of the components of a paste or dough. Generally, shear-mixing means will be employed which comprise a multitude of blades or paddles rotating in adjacent planes about a common shaft, with a shearing or grinding effect resulting from a minimal clearance between the rotating blades, blades and side walls, and/or blades and one or more stationary shear bars. Shear-mixers are typically designed to maintain the total mixture in close proximity to the rotating blades or paddles to take full advantage of the shearing effect. The power input per unit mass is a convenient measure of the intensity or severity of the mixing operation with respect to a particular mixture. For example, an energy input equivalent to about 10 watt-hours per pound of dry refractory inorganic oxide present in the mixture of this invention over a period of from about 0.5 to about 5 minutes (corresponding to a power input of from about 120 to about 1200 watts per pound) has been found to effect a shear-mixing operation of suitable intensity or severity to result in a uniform dispersion of the components of said mixture.

It is generally recognized that catalysis involves a mechanism particularly noted for its unpredictability. Minor variations in a method of manufacture often result in an unexpected improvement in the catalyst product. The improvement may result from an undetermined and minor variation of the physical characteristics and/or composition of a catalyst product to yield a novel composition difficult of definition and apparent only as a result of substantially improved activity, selectivity, and/or stability with respect to one or more chemical reactions. In the present case, the shear-mixing operation heretofore described with respect to the mixture of this invention is effected to achieve a substantially uniform dispersion of the components of said mixture and there is little if any apparent improvement with respect to dispersion as the severity of the shear-mixing operation is increased. Increasing the severity of the operation would therefore appear to be unwarranted. However, it has been observed that when the severity of the shear-mixing operation has been increased as herein contemplated, there is a substantial improvement in the catalytic activity of the end product, particularly when employed as a hydrotreating catalyst in conjunction with a Group VIB and Group VIII metal component. Thus, in accordance with this invention, the described mixture is maintained under shear-mixing conditions, the intensity of said shear-mixing being characterized by an energy input equivalent to from about 15 to about 120 watt-hours per pound of dry refractory inorganic oxide contained in said mixture, for a period of from about 0.5 to about 5 minutes, and in a preferred embodiment, the mixture is maintained under shear-mixing conditions the intensity of which is characterized by an energy input equivalent to from about 15 to about 60 watt-hours per pound of dry refractory inorganic oxide contained in said mixture for a period of from about 1 to about 3 minutes.

The extrusion operation is suitably effected with commercial extrusion apparatus. For example, the dough is continuously processed through a cylinder by means of a rotating screw, and pressured through a perforated plate at one end of the cylinder. The extrudate may be cut into particles of desired length prior to drying and calcining by means of a rotating knife as the extrudate emerges from the perforated plate. Alternatively, the extrudate may be broken into particles of random length during the drying and calcining process. In any case, the extrudate is dried and calcined, drying being usually accomplished at a temperature up to about 120° C. over a 1-24 hour period, and calcining being preferably effected in an oxidizing atmosphere such as air at a temperature of from about 315° to about 650° C. over a period of from about 2 to about 4 hours.

As heretofore mentioned, the extruded product of this invention is particularly useful in combination with a Group VIB and Group VIII metal component as a hydrotreating catalyst. The Group VIB and Group VIII metal component may be combined with the extrudate by any suitable means including coextrusion and/or impregnation. For example, a Group VIB metal compound and a Group VIII metal compound can be dry-mixed with the finely divided refractory inorganic oxide, and the mixture further treated in accordance with the method of this invention. Molybdic anhydride or molybdic acid are particularly suitable Group VIB metal compounds, and cobalt carbonate is a particularly suitable Group VIII metal compound for dry-mixing with a finely divided refractory inorganic oxide. Other suitable Group VIB metal compounds, that is, compounds of molybdenum, tungsten, and chromium, include molybdic acid, ammonium molybdate, ammonium chromate, chromium acetate, chromous chloride, chromium nitrate, tungstic acid, etc. Other Group VIII metal compounds which may be employed, that is, compounds of iron, nickel, cobalt, platinum, palladium, rhodium, ruthenium, osmium and iridium, include nickel nitrate, nickel sulfate, nickel chloride, nickel acetate, cobaltous nitrate, cobaltous sulfate, ferric nitrate, ferric sulfate, platinum chloride, palladium chloride, and the like.

The extruded product of this invention, with or without a coextruded Group VIB and Group VIII metal component combined therewith, is advantageously impregnated with a Group VIB and Group VIII metal component by conventional impregnation techniques to provide a final composite comprising from about 4 to about 30 wt. % Group VIB metal and from about 1 to about 10 wt. % Group VIII metal. Impregnation can be accomplished by conventional techniques whereby the extrudate particles are soaked, dipped, suspended or otherwise immersed in an impregnating solution at conditions to adsorb a soluble compound comprising the desired catalytic component. Certain impregnating techniques have been found to be particularly favorable to promote desired physical properties of the finished catalyst. Thus, impregnation of the Group VIB and Group VIII metal components is preferably from a common aqueous ammoniacal solution of soluble compounds thereof, for example, an ammoniacal solution of molybdic acid and cobalt nitrate. Further, the impregnation is preferably effected utilizing a minimal volume of impregnating solution commensurate with an even distribution of the catalytic components on the calcined extrudate particles. One preferred method involves the use of a steam-jacketed rotary dryer. The extrudate particles are immersed in the impregnating solution contained in the dryer and tumbled therein by the rotating motion of the dryer, the volume of extrudate particles so treated being initially in the range of from about 0.7 to about 1.0 with respect to the volume of the impregnating solution. Evaporation of the solution in contact with the extrudate particles is expedited by applying steam to the dryer jacket. The evaporation is further facilitated by a continuous purge of the dryer utilizing a flow of dry gas, suitably air or nitrogen. The impregnated particles, thus dried, are thereafter calcined in an oxygen-containing atmosphere at the aforesaid temperature of from about 315° to about 650° C. over a period of from about 2 to about 4 hours.

When the Group VIB and Group VIII metal components are combined with the refractory inorganic oxide extrudate by coextrusion as well as impregnation, it is preferred to add from about 10 to about 40 wt. % of said components, and more preferably from about 20 to about 30 wt. %, by the coextrusion technique, the remainder of said components being added by impregnation.

The following examples are presented in illustration of the improvement derived through the practice of one preferred embodiment of this invention, and are not to be construed as an undue limitation on the generally broad scope of the invention as set out in the appended claims.

EXAMPLE I

An alpha-alumina monohydrate (Catapal SB) having an average bulk density of about 0.79 grams per cubic centimeter was blended with a powdered alpha-alumina monohydrate (Kaiser Medium) having an average bulk density of from about 0.23 grams per cubic centimeter to yield a blend with average bulk density of approximately 0.45 grams per cubic centimeter, 95% of which was filterable through a 105 micron microsieve. The alumina blend was then dry-mixed with molybdic acid and cobalt carbonate, and a 5% aqueous nitric acid solution was added thereto to form an extrudable dough. In this example, the resulting mixture was subjected to an intense shear-mixing over a 1 minute interval, the energy input during said interval being equivalent to about 31 watt-hours per pound of alumina contained in said mixture. The cobalt carbonate and molybdic acid were then coextruded with the alumina as a dough characterized by a weight loss on ignition at 900° C. of 55–60%. The resulting extrudate was dried and calcined in air for 1 hour at about 345° C., and for an additional 2 hours at about 595° C. The calcined extrudate, broken into lengths of approximately one-eighth inch, were then impregnated with a common ammoniacal solution of cobalt nitrate and molybdic acid prepared by commingling an aqueous solution of molybdic acid and ammonium hydroxide with an aqueous solution of cobalt nitrate hexahydrate and ammonium hydroxide. The extrudate particles were immersed in the solution which was then evaporated to dryness. The impregnated extrudate was subsequently calcined, first at about 330° C. for 1 hour in air containing 22% steam, and then at about 5° C. for 2 hours in air. The calcined product contained 3.2 wt. % cobalt and 12.9 wt. % molybdenum, 75% of said metals resulting from the coextrusion step and 25% from the impregnation step.

EXAMPLE II

The product of this example was prepared essentially as described in the previous example except that 50% of the cobalt and molybdenum components was incorporated in the product during the coextrusion step with the remaining 50% being incorporated by means of the impregnation step. The product contained, in total, 3.1 wt. % cobalt, and 13.0 wt. % molybdenum.

EXAMPLE III

In this example, the extrudate product was again prepared essentially as described in the previous examples with the exception that only 25% of the cobalt and molybdenum components resulted from the coextrusion step, the other 75% resulting from the impregnation step. In this example, the extrudate product totaled 3.35 wt. % cobalt and 13.5 wt. % molybdenum.

EXAMPLE IV

An alpha-alumina monohydrate blend was prepared substantially as described in the previous examples. A 5 wt. % aqueous nitric acid solution was added to the blend, and the mixture subjected to an intense shear-mixing operation as in the preceding examples. The resulting dough, which exhibited a 55–60% weight loss on ignition at 900° C., was extruded, dried and calcined, all in accordance with the foregoing examples. The calcined particles were then impregnated with a common ammoniacal solution of molybdic acid and cobalt nitrate prepared by commingling an aqueous solution of molybdic acid and ammonium hydroxide with an aqueous solution of cobalt nitrate hexahydrate and ammonium hydroxide. The particles were immersed in the solution which was then evaporated to dryness. The particles were subsequently calcined in air containing 22% steam for about 1 hour at about 330° C., and an additional 2 hours at 510° C. The catalyst product contained 3.3 wt. % cobalt and 13.7 wt. % molybdenum, all of which was derived from the impregnation process.

EXAMPLE V

The heretofore described alpha-alumina monohydrate blend was dry-mixed with a finely powdered molybdic oxide and cobalt carbonate. The 5% aqueous nitric acid solution was added and the resulting mixture subjected to a normal shear-mixing operation over a 1 minute period, the energy input being in this case equivalent to about 10 watt-hours per pound of alumina contained in the mixture. The resulting dough, which exhibited a 55–60 wt. % loss on ignition at 900° C., was extruded, dried and calcined as described. The calcined extrudate was then impregnated with a common ammoniacal solution of molybdic acid and cobalt nitrate prepared by commingling an aqueous solution of molybdic acid and ammonium hydride with an aqueous solution of cobalt nitrate hexahydrate and ammonium hydroxide. The extrudate particles were immersed in the common solution which was then evaporated to dryness. The impregnated extrudate particles were then calcined in the described manner. The calcined product contained 2.9 wt. % cobalt and 11.3 wt. % molybdenum, 75% of said metals resulting from the coextrusion step and 25% from the impregnation step.

EXAMPLE VI

The extruded catalyst of this invention was prepared in essentially the same manner as that of the previous example, including normal shear-mixing with an energy input over a 1 minute period of about 10 watt-hours per pound of alumina contained in the mixture, except that in this case 50% of the cobalt and molybdenum components were incorporated in the catalyst during the coextrusion, the remaining 50% being incorporated during the impregnation step. The catalyst product contained in all 2.24 wt. % cobalt and 10.6 wt. % molybdenum.

EXAMPLE VII

In this example, the extrudate product was again prepared in essentially the same manner as that of Example V, including normal shear-mixing with an energy input over a 1 minute interval equivalent to about 10 watt-hours per pound of alumina, except in this case only 25% of the cobalt and molybdenum components was composited with the catalyst during the coextrusion step while 75% was by means of the impregnation step. In all, the catalyst product contained 3.65 wt. % cobalt and 13.4 wt. % molybdenum.

EXAMPLE VIII

The alpha-alumina monohydrate blend of the previous examples, with 5 wt. % aqueous nitric acid added thereto, was subjected to a normal shear-mixing operation over a 1 minute period. The energy input in this instance was equivalent to about 10 watt-hours per pound of alumina – a normal shear-mixing operation. The resulting dough, with a 55–60 wt. % loss on ignition at 900° C., was extruded, dried and calcined as in the prior examples. The calcined extrudate was then impregnated with a common ammoniacal solution of molybdic acid and cobalt nitrate prepared as heretofore described. The calcined particles were immersed in the solution which was then evaporated to dryness. The impregnated particles were subsequently calcined in air for about 1 hour at 400° C., and for an additional 2 hours at 595° C. as previously practiced. The calcined product contained 3.0 wt. % cobalt and 10.3 wt. % molybdenum.

The above-described catalysts were evaluated with respect to the desulfurization of a vacuum gas oil boiling in the 315–565° C. range and containing 2.6 wt. % sulfur. In each case, the catalyst was disposed as a fixed bed in a vertical tubular reactor maintained at 750 psig. and 385° C. The vacuum gas oil was charged over the catalyst at 3.2 liquid hourly space velocity in admixture with 1800 standard cubic feet of hydrogen per barrel of feed stock. The reactor effluent was separated into a liquid and gaseous phase in a high pressure separator at 93° C. and the liquid phase was treated in a stripper column for the separation of light ends. Four 2-hour test periods were run, each separated by a 10-hour line-out period. The liquid stripper bottoms from each test period were analyzed for sulfur and the arithmetic average of the four test periods was used to determine the activity of the catalyst relative to that of a reference standard catalyst under the same conditions, the standard catalyst comprising 2.5 wt. % cobalt and 8.7 wt. % molybdenum on 1/16 inch alumina spheres. The relative activity was computed as the ratio of the desulfurization rate of the test catalyst to that of the reference catalyst. The date accumulated with respect to the catalysts of Examples I, II, III, IV, V, VI, VII and VIII are set out in Table I below.

TABLE I

| Catalyst | I | II | III | IV | V | VI | VII | VIII |
|---|---|---|---|---|---|---|---|---|
| Mixing Mode | Intense | Intense | Intense | Intense | Normal | Normal | Normal | Normal |
| Metals Addition | | | | | | | | |
| Coextrusion, % | 75 | 50 | 25 | 0 | 75 | 50 | 25 | 0 |
| Impregnation, % | 25 | 50 | 75 | 100 | 25 | 50 | 75 | 100 |
| Bulk Density, gms/cc | 0.75 | 0.74 | 0.72 | 0.78 | 0.73 | 0.73 | 0.81 | 0.73 |
| Particle Density, gms/cc | 1.30 | 1.39 | 1.34 | 1.52 | 1.27 | 1.32 | 1.46 | 1.31 |
| Surface Area, m$^2$/gm | 249 | 279 | 270 | 236 | 279 | 301 | 225 | 259 |
| Pore Volume, cc/gm | 0.48 | 0.44 | 0.47 | 0.38 | 0.48 | 0.48 | 0.42 | 0.49 |
| Pore Diameter, A$\dot{s}$b,9 | 72 | 66 | 70 | 68 | 71 | 64 | 69 | 81 |
| Metals | | | | | | | | |
| Cobalt, wt. % | 3.2 | 3.1 | 3.35 | 3.3 | 2.9 | 2.24 | 3.65 | 3.0 |
| Molybdenum, wt. % | 12.9 | 13.0 | 13.5 | 13.7 | 11.3 | 10.6 | 13.4 | 10.3 |
| Relative Activity | 146 | 148 | 191 | 162 | 106 | 117 | 126 | 100 |

It is apparent with reference to the tabulated date that the intensity of the shear-mixing operation, as herein designed, has a decided and beneficial effect on the catalytic activity of the final product. And it is also apparent that, of the catalyst prepared under intense shear-mixing conditions, those catalysts exhibit a further significant improvement in activity wherein from about 10 to about 40 wt. % of the metals components, cobalt and molybdenum, have been coextruded with the alumina and from about 90 to about 60 wt. % impregnated thereon.

The present invention therefore further embodies an extruded composition comprising from about 1 to about 10 wt. % Group VIII metal and from about 4 to about 30 wt. % Group VIB metal prepared by the method which comprises admixing a finely divided refractory inorganic oxide, a Group VIII metal compound, a Group VIB metal and a peptizing agent to produce a mixture characterized by a weight loss on ignition at 900° C. of from about 50 to about 70%, said Group VIII metal compound and Group VIB metal compound being in sufficient concentration to provide from about 10 to about 40 wt. % of the Group VIII and Group VIB metal components of the final extruded composition; maintaining said mixture under shear-mixing conditions, the intensity of said shear-mixing being characterized by an energy input equivalent to from about 15 to about 120 watt-hours per pound of dry refractory inorganic oxide contained in said mixture over a period of from about 0.5 to about 5 minutes; extruding the resulting dough, and drying and calcining the extrudate; impregnating the calcined extrudate with a Group VIII metal compound and a Group VIB metal compound in an amount to provide a final extruded composite comprising from about 1 to about 10 wt. % Group VIII metal and from about 4 to about 30 wt. % Group VIB metal; and drying and calcining the resulting composition in an oxidizing atmosphere.

We claim as our invention:

1. An extruded composition prepared by the method which comprises:
   a. admixing a finely divided refractory inorganic oxide, a peptizing agent and sufficient water to produce a mixture characterized by a weight loss on ignition at 900° C. of from about 50 to about 70%;
   b. maintaining said mixture under shear-mixing conditions, the intensity of said shear-mixing being characterized by an energy input equivalent to from about 15 to about 120 watt-hours per pound of dry refractory inorganic oxide contained in said mixture over a period of from about 0.5 to about 5 minutes;
   c. extruding the resulting dough and drying and calcining the extrudate.

2. The composition of claim 1 further characterized in that the intensity of said shear-mixing is characterized by an energy input equivalent to from about 15 to about 60 watt-hours per pound of dry refractory inorganic oxide contained in said mixture over a period of from about 1 to about 3 minutes.

3. The composition of claim 1 further characterized in that said refractory inorganic oxide is an alumina.

4. The composition of claim 1 further characterized in that said refractory inorganic oxide is an alpha-alumina monohydrate.

5. The composition of claim 1 further characterized in that said refractory inorganic oxide is an alpha-alumina monohydrate with an average bulk density of from about 0.4 to about 0.5 grams per cubic centimeter.

6. The composition of claim 1 further characterized in that said refractory inorganic oxide is a blend of an alpha-alumina monohydrate having an average bulk density of from about 0.7 to about 0.9 grams per cubic centimeter, and an alpha-alumina monohydrate having an average bulk density of from about 0.2 to about 0.3 grams per cubic centimeter, the blend having an average bulk density of from about 0.4 to about 0.5 grams per cubic centimeter.

7. An extruded composition comprising from about 1 to about 10 wt. % Group VIII metal and from about 4 to about 30 wt. % Group VIB metal, prepared by the method which comprises:
   a. admixing a finely divided refractory inorganic oxide, a Group VIII metal compound, a Group VIB metal compound and a peptizing agent to produce a mixture characterized by a weight loss on ignition at 900° C. of from about 50 to about 70%, said Group VIII metal compound and Group VIB metal compound being in sufficient concentration to provide from about 10 to about 40 wt. % of the Group VIII and Group VIB metal components of the final extruded composition;
   b. maintaining said mixture under shear-mixing conditions, the intensity of said shear-mixing being characterized by an energy input equivalent to from about 15 to about 120 watt-hours per pound of dry refractory inorganic oxide contained in said mixture over a period of from about 0.5 to about 5 minutes;
   c. extruding the resulting dough, and drying and calcining the extrudate;
   d. impregnating the calcined extrudate with a Group VIII metal compound and a Group VIB metal compound in an amount to provide a final extruded composite comprising from about 1 to about 10 wt. % Group VIII metal and from about 4 to about 30 wt. % Group VIB metal; and
   e. drying and calcining the resulting composition in an oxidizing atmosphere.

8. The composition of claim 7 further characterized in that the intensity of said shear-mixing is characterized by an energy input equivalent to from about 15 to about 60 watt-hours per pound of dry refractory inorganic oxide contained in said mixture over a period of from about 1 to about 3 minutes.

9. The composition of claim 7 further characterized in that said refractory inorganic oxide is an alumina.

10. The composition of claim 7 further characterized in that said refractory inorganic oxide is an alpha-alumina monohydrate.

11. The composition of claim 7 further characterized in that said refractory inorganic oxide is an alpha-alumina monohydrate with an average bulk density of from about 0.4 to about 0.5 grams per cubic centimeter.

12. The composition of claim 7 further characterized in that said refractory inorganic oxide is a blend of an alpha-alumina monohydrate having an average bulk density of from about 0.7 to about 0.9 grams per cubic centimeter, and an alpha-alumina monohydrate having an average bulk density of from about 0.2 to about 0.3 grams per cubic centimeter, the blend having an average bulk density of from about 0.4 to about 0.5 grams per cubic centimeter.

13. The composition of claim 7 further characterized with respect to step (a) in that said Group VIII metal compound and said Group VIB metal compound are in sufficient concentration to provide from about 20 to about 30 wt. % of the Group VIII and Group VIB metal components of the final extruded composition.

14. The composition of claim 7 further characterized in that said Group VIII metal is cobalt.

15. The composition of claim 7 further characterized in that said Group VIB metal is molybdenum.

16. The composition of claim 7 further characterized in that cobalt carbonate is utilized in step (a).

17. The composition of claim 7 further characterized in that molybdic acid is utilized in step (a).

* * * * *